United States Patent
Wang et al.

(10) Patent No.: US 12,079,476 B2
(45) Date of Patent: Sep. 3, 2024

(54) DATA PROCESSING METHOD, APPARATUS, DEVICE, AND READABLE STORAGE MEDIUM

(71) Applicant: SHENZHEN DAPU MICROELECTRONICS CO., LTD., Shenzhen (CN)

(72) Inventors: Yan Wang, Shenzhen (CN); Weijun Li, Shenzhen (CN)

(73) Assignee: SHENZHEN DAPU MICROELECTRONICS CO., LTD., Shenzhen (CN)

(*) Notice: Subject to any disclaimer, the term of this patent is extended or adjusted under 35 U.S.C. 154(b) by 139 days.

(21) Appl. No.: 17/733,225

(22) Filed: Apr. 29, 2022

(65) Prior Publication Data
US 2022/0253214 A1 Aug. 11, 2022

Related U.S. Application Data

(63) Continuation of application No. PCT/CN2020/102020, filed on Jul. 15, 2020.

(30) Foreign Application Priority Data

Nov. 6, 2019 (CN) .................. 201911077491.9

(51) Int. Cl.
G06F 3/06 (2006.01)
(52) U.S. Cl.
CPC ............ *G06F 3/061* (2013.01); *G06F 3/0653* (2013.01); *G06F 3/0679* (2013.01)
(58) Field of Classification Search
CPC ........ G06N 3/0442; G06N 3/044; G06N 3/08; G06N 3/045; G06N 3/02; G06N 3/0464;
(Continued)

(56) References Cited

U.S. PATENT DOCUMENTS

| 7,502,358 B1* | 3/2009 | Kopikare ............. H04W 74/06 370/348 |
| 7,996,642 B1* | 8/2011 | Smith ................. G06F 12/0246 711/167 |
| 2016/0350324 A1 | 12/2016 | Wang et al. |
| 2017/0262216 A1 | 9/2017 | Polkovnikov et al. |

(Continued)

FOREIGN PATENT DOCUMENTS

| CN | 104679445 A | 6/2015 |
| CN | 109543832 A | 3/2019 |

(Continued)

OTHER PUBLICATIONS

Sangeetha Abdu Jyothi, et al., Morpheus: towards automated SLOs for enterprise clusters, 2016, in Proceedings of the 12th USENIX conference on Operating Systems Design and Implementation (OSDI'16). Usenix Association, USA, 117-134. (Year: 2016).*
Roger Henriksson, Scheduling Garbage Collection in Embedded Systems, Jul. 1998, Lund University, pp. 1-164 (Year: 1998).*

(Continued)

*Primary Examiner* — Curtis James Kortman
(74) *Attorney, Agent, or Firm* — Bayes PLLC (57) ABSTRACT

A data processing method, apparatus, device, and readable storage medium are provided. The method includes: acquiring historical I/O data (S101), where the historical I/O data is data of a solid-state drive that is accessed within a preset time period; using a prediction model to learn the historical I/O data to obtain a prediction result (S102), where the prediction result includes a data intensity of the solid-state drive to be accessed within a future window period, and the future window period is determined according to a cycle in which the solid-state drive is accessed; and managing the solid-state drive according to the prediction result (S103).

18 Claims, 5 Drawing Sheets

(58) Field of Classification Search
CPC .................... G06N 3/049; G06N 20/00; G06F
2212/7205; G06F 2212/7202; G06F
3/0659; G06F 3/061; G06F 3/0673; G06F
3/0652; G06F 3/0644; G06F 3/0653;
G06F 3/064; G06F 12/0246; G06F
12/0253
See application file for complete search history.

(56) References Cited

U.S. PATENT DOCUMENTS

2018/0300084 A1\* 10/2018 Kachare .............. G06F 11/3452
2019/0317901 A1\* 10/2019 Kachare .................. G06F 3/064

FOREIGN PATENT DOCUMENTS

| CN | 109670581 A | 4/2019 | | |
|---|---|---|---|---|
| CN | 109976905 A | 7/2019 | | |
| CN | 109992210 A | 7/2019 | | |
| CN | 110389909 A | 10/2019 | | |
| CN | 110764714 A | 2/2020 | | |
| CN | 111913649 A | 11/2020 | | |
| JP | 2012231445 A | \* | 11/2012 | ............. H04L 12/54 |
| WO | 2018184204 A1 | 10/2018 | | |

OTHER PUBLICATIONS

International Search Report and Written Opinion in corresponding PCT Application No. PCT/CN2020/102020 dated Sep. 29, 2020 (10 pages).

\* cited by examiner

DATA PROCESSING METHOD, APPARATUS, DEVICE, AND READABLE STORAGE MEDIUM

CROSS-REFERENCE TO RELATED APPLICATIONS

The present application is continuation of International Application No. PCT/CN2020/102020, filed on Jul. 15, 2020, entitled "DATA PROCESSING METHOD, APPARATUS, DEVICE, AND READABLE STORAGE MEDIUM," which claims the priority to Chinese Patent Application No. 201911077491.9, filed on Nov. 6, 2019, entitled "DATA PROCESSING METHOD, APPARATUS, DEVICE, AND READABLE STORAGE MEDIUM," both of which are incorporated herein by reference in their entirety.

TECHNICAL FIELD

The present application relates to the field of computer technologies, and in particular, to a data processing method, apparatus, device, and readable storage medium.

BACKGROUND

In the prior art, management of a solid-state drive is mostly determined by a technician based on his own experience. Therefore, the management of the solid-state drive depends on the work experience and professional knowledge of the technician, and has high requirements for the technician. Moreover, a management strategy summarized by the technician based on the experience has more subjective opinions, and therefore, the management strategy may not be accurate enough. When there is a deviation in the management strategy, a management operation of the solid-state drive will affect an external service provided by the solid-state drive, which will reduce read-write performances of the solid-state drive, prolong a response time to a user operation, and reduce a service capability of a low-level solid-state drive.

Therefore, how to implement effective management of the solid-state drive to improve the read-write performances of the solid-state drive is a problem to be solved by those skilled in the art.

SUMMARY

In view of this, an objective of the present application is to provide a data processing method, apparatus, device, and readable storage medium, so as to realize effective management of a solid-state drive and improve read-write performances of the solid-state drive. Its specific solutions are as follows:

In a first aspect, the present application provides a data processing method, applied to a solid-state drive, including:
  acquiring historical input/output (I/O) data, where the historical I/O data includes data of the solid-state drive that is accessed within a preset time period;
  using a prediction model to learn the historical I/O data to obtain a prediction result, where the prediction result includes a data intensity of the solid-state drive to be accessed within a future window period, and the future window period is determined according to a cycle in which the solid-state drive is accessed; and
  managing the solid-state drive according to the prediction result.

Preferably, a process of determining the future window period includes:
  responsive to the solid-state drive being accessed by only one service, a cycle in which the solid-state drive is accessed by the service as the future window period.

Preferably, the process of determining the future window period includes:
  responsive to the solid-state drive being accessed by a plurality of services, determining a corresponding cycle in which the solid-state drive is accessed by each service so that a plurality of cycles are determined for the plurality of services, respectively; and
  calculating a least common multiple of the plurality of cycles, and determining the future window period through the least common multiple.

Preferably, the determining the future window period through the least common multiple includes:
  determining a maximum cycle among the plurality of cycles as a lower limit value of the future window period;
  determining the least common multiple as an upper limit value of the future window period; and
  determining any target value that is not less than the lower limit value and not greater than the upper limit value as the future window period.

Preferably, the method further includes:
  calculating a greatest common divisor of the plurality of cycles and determining the greatest common divisor as a prediction interval; and
  determining a plurality of prediction points in the future window period according to the prediction interval.

Preferably, the using the prediction model to learn the historical I/O data to obtain the prediction result includes:
  using a long short-term memory (LSTM) model to learn the historical I/O data to obtain the prediction result.

Preferably, the managing the solid-state drive according to the prediction result includes:
  performing at least one of a cache management or garbage collection on the solid-state drive according to the prediction result.

In a second aspect, the present application provides a data processing apparatus applied to a solid-state drive, including:
  an acquisition module configured to acquire historical I/O data, where the historical I/O data includes data of the solid-state drive that is accessed within a preset time period;
  a prediction module configured to use a prediction model to learn the historical I/O data to obtain a prediction result, where the prediction result includes a data intensity of the solid-state drive to be accessed within a future window period, and the future window period is determined according to a cycle in which the solid-state drive is accessed; and
  a management module configured to manage the solid-state drive according to the prediction result.

In a third aspect, the present application provides a data processing device, including:
  a memory configured to store a computer program; and
  a processor configured to execute the computer program to implement the data processing method disclosed in the foregoing.

In a fourth aspect, the present application provides a readable storage medium configured to store a computer program, where the computer program, when executed by a processor, implements the data processing method disclosed in the foregoing.

As it can be seen from the above solutions, the present application provides a data processing method, which is applied to the solid-state drive and includes: acquiring historical I/O data, where the historical I/O data is data of the solid-state drive that is accessed within a preset time period; using a prediction model to learn the historical I/O data to obtain a prediction result, where the prediction result includes a data intensity of the solid-state drive to be accessed within a future window period, and the future window period is determined according to a cycle in which the solid-state drive is accessed; and managing the solid-state drive according to the prediction result.

As it can be seen, after acquiring the historical I/O data, the method uses the prediction model to learn the historical I/O data, so as to obtain the prediction result. The prediction result includes the data intensity of the solid-state drive to be accessed within the future window period. The data intensity can indicate a data read/write pressure of the solid-state drive in the future window period. When the data intensity is high, it indicates that the data read/write pressure of the solid-state drive in the future window period is high. When the data intensity is small, it indicates that the data read/write pressure of the solid-state drive in the future window period is low. Therefore, the managing the solid-state drive according to the prediction result includes: when the data read/write pressure of the solid-state drive in the future window period is high, suspending a low-priority service request in the solid-state drive during the future window period; and when the data read/write pressure of the solid-state drive in the future window period is low, responding to the low-priority service request in the solid-state drive in a timely manner within the future window period, so as to avoid a low-priority service from affecting response of the solid-state drive to an user read/write operation. The future window period is determined according to a cycle in which the solid-state drive is accessed, that is, the prediction result output by the prediction model is associated with the cycle in which the solid-state drive is accessed. The access period has a certain regularity, it thus provides a guarantee for the accuracy of the prediction result, thereby providing a reliable data support for the effective management of the solid-state drive. Therefore, the present application realizes the effective management of the solid-state drive, improves the read-write performances of the solid-state drive, and avoids a delay of a response time to a user operation, thereby improving a service capability of the solid-state drive.

Correspondingly, a data processing apparatus, device, and readable storage medium provided by the present application also have the above technical effects.

BRIEF DESCRIPTION OF THE DRAWINGS

In order to more clearly illustrate the technical solutions in the embodiments of the present application or in the prior art, accompanying drawings required for the description of the embodiments or the prior art will be briefly introduced below. It is apparent that the accompanying drawings in the following description are merely embodiments of the present application. For those of ordinary skills in the art, other accompanying drawings can also be derived according to the provided accompanying drawings without any creative efforts.

DETAILED DESCRIPTION

The technical solutions in the embodiments of the present application will be clearly and completely described below with reference to the accompanying drawings in the embodiments of the present application. It is apparent that the described embodiments are merely part of the embodiments of the present application, rather than all of the embodiments, Based on the embodiments in the present application, all other embodiments derived by those of ordinary skills in the art without creative efforts shall fall within the scope of protection of the present application.

At present, a management strategy may be inaccurate due to more subjective opinions of the management strategy summarized by technicians based on experience. When there is a deviation in the management strategy, a management operation of a solid-state drive will affect an external service provided by the solid-state drive, which will reduce read-write performances of the solid-state drive, prolong a response time to a user operation, and reduce a service capability of a low-level solid-state drive. To this end, the present application provides a data processing solution that can implement effective management of the solid-state drive, so as to improve the read-write performances of the solid-state drive.

Figure 1:
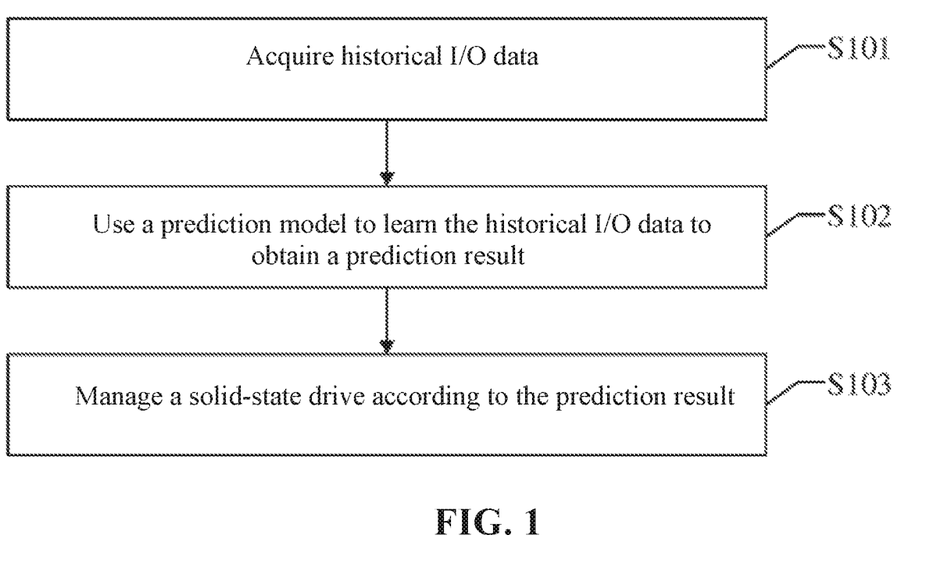
FIG. 1 is a flowchart of a data processing method disclosed in the present application.

Referring to FIG. 1, a first data processing method is disclosed in an embodiment of the present application, which is applied to a solid-state drive, including the following steps.

S101: Acquire historical I/O data.

It should be noted that a method of acquiring data may include: acquiring data through a software interface, or acquiring data from a storage medium through a hardware interface, or receiving data sent by a data sending end through a network line, or the like. The historical I/O data is: data of the solid-state drive that is accessed within a preset time period, that is, data involved in a read and/or write operation of some objects to the solid-state drive within the preset time period. The historical I/O data includes: I/O type (read or write), timestamp, I/O size (data size), and the like. The preset time period is a time period during which the historical I/O data is generated, and in general, the preset time period is not less than a time length of a future window period. For example, by taking a current moment as a limit, the preset time period is 10 seconds before the current moment, and the future window period is 10 seconds, 8 seconds, 5 seconds, or less after the current moment.

S102: Use a prediction model to learn the historical I/O data to obtain a prediction result.

Specifically, the prediction model can predict data and a data intensity involved in the read and/or write operation of some objects to the solid-state drive during the future window period based on the historical I/O data. Therefore, the prediction result includes the data intensity of the solid-state drive to be accessed in the future window period. The future window period is a certain time period in the future. The future window period is determined according to a cycle in which the solid-state drive is accessed, that is, the prediction result output by the prediction model is associated with the cycle in which the solid-state drive is accessed. The data intensity refers to a read I/O intensity, a write I/O intensity, or a read/write ratio.

In a specific implementation manner, a process of determining the future window period includes determining, if the solid-state drive is accessed by only one service, a cycle in which the solid-state drive is accessed by the current service as the future window period. Specifically, in a training process of the prediction model, the cycle in which the solid-state drive is accessed by the current service is determined as the future window period, then the prediction result may be set to include: the data and/or data volume, that is, the data intensity, involved in the read and/or write operation of the solid-state drive by the current service. The future window period is the cycle in which the solid-state drive is accessed by the current service. For example, if the current service accesses the solid-state drive every 10 seconds, the future window period is set to 10 seconds, and the prediction result may include: the data and data intensity involved in the read and/or write operation of the solid-state drive by the current service within the next 10 seconds.

Specifically, after the cycle in which the solid-state drive is accessed by the current service is determined as the future window period, a prediction interval may be set in the future window period. For example, 10 prediction points are set in the future window period, each prediction point is predicted once for the read operation and predicted once for the write operation, and then the prediction result Y={y1, y2, . . . , y10, y11, . . . , y20}, where {y1, y2, . . . y10} are predicted values for the read operation, and {y11, y12, . . . , y20} are predicted values for the write operation. The current service periodically accesses the solid-state drive; therefore, theoretically, the prediction model can predict the I/O data of a future moment from the I/O data of the previous moment. In an actual application process, an input of the prediction model may select more I/O data. For example, a sample input is X={x1, x2, . . . , x8}, X is the historical I/O data of the current service accessing the solid-state drive, and xi represents a ternary variable (timestamp, I/O type, and I/O size) of each I/O data. The longer the preset time period is set, the more input the prediction model will have.

A start point of the future window period may be an end point of a time period in which the input data of the prediction model lies. For example, the time period in which the input data of the prediction model lies is from a $13^{th}$ second to a $14^{th}$ second, then the future window period may be from the $14^{th}$ second to a $15^{th}$ second, where the start point of the future window period is at the $14^{th}$ second, that is, the end point of the time period in which the input data lies.

If the cycle in which the current service accesses the solid-state drive varies, the total time length of the input data and the number of sampling points may be increased. For example, an original input of the prediction model is: I/O data in the previous 10 seconds, of which the I/O data is collected every 5 seconds; if the cycle varies, the input of the prediction model may be adjusted to: I/O data in the previous 20 seconds, where the I/O data is collected every 2 seconds. The total time length (i.e., the preset time period) of the input data may be equal to the future window period, so that the I/O data of each sampling point is in one-to-one correspondence with the predicted value of the predicted point.

In a specific implementation, the process of determining the future window period includes: determining, if the solid-state drive is accessed by a plurality of services, a cycle in which the solid-state drive is accessed by each service; and calculating a least common multiple of all the cycles, and determining the future window period through the least common multiple. Specifically, it is assumed that there are 3 services accessing the solid-state drive according to their respective cycles. The cycle of service A accessing the solid-state drive is 10 seconds, the cycle of service B accessing the solid-state drive is 20 seconds, and the cycle of service C accessing the solid-state drive is 30 seconds, then the least common multiple of all the cycles is 60 seconds. Therefore, the future window period is set to 60 seconds, and the prediction result includes: the data and data intensity involved in the read and/or write operation of the solid-state drive within the next 60 seconds.

It should be noted that the service of accessing the solid-state drive may belong to an upper application layer, and specifically may belong to an application on a host side, such as a database.

In this embodiment, using the prediction model to learn the historical I/O data to obtain the prediction result includes: using an LSTM model to learn the historical I/O data to obtain the prediction result. For the structure of the prediction model, reference may be made to FIG. 2. A multi-layer structure may further be set, so that a prediction capability of the prediction model is stronger. For example, in a two-layer structure shown in FIG. 3, each box in FIG. 3 is an LSTM Cell set. According to this, more LSTM Cells may be set to form a three-layer network structure, a four-layer network structure, or a network structure with even more layers, thereby improving the prediction accuracy of the prediction model. The LSTM model may be seq2seq.

Figure 2:
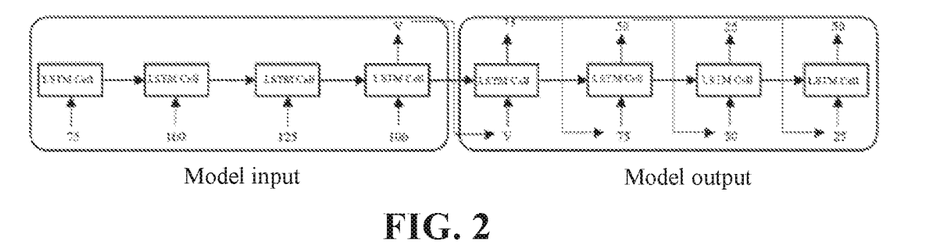
FIG. 2 is a structural diagram of a prediction model disclosed in the present application.
Figure 3:
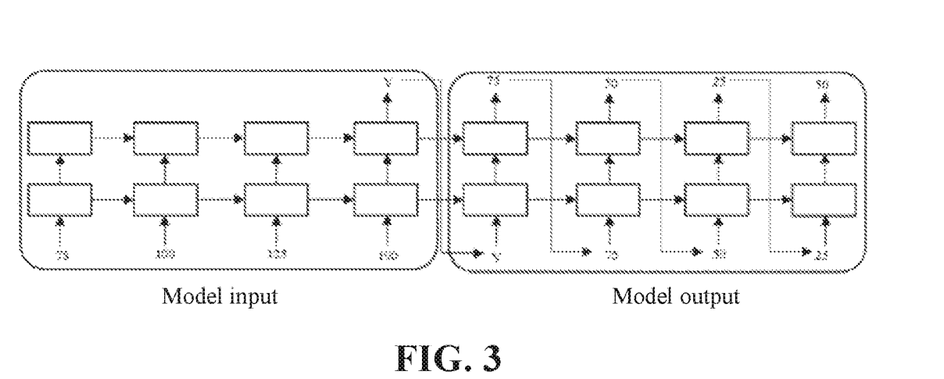
FIG. 3 is a structural diagram of another prediction model disclosed in the present application.

In FIG. 2, write operation data of a service to the solid-state drive in the previous 4 seconds is used as a model input to predict a write operation of the service to the solid-state drive in the next 4 seconds. The operation type and time have been specified here, and therefore, an input sequence does not include variables such as timestamp and I/O type. 4 seconds is the future window period, during which the prediction interval is 1 second.

Specifically, by taking a current moment as a limit, an input-output relationship of the example in FIG. 2 is: 75, 100, 125, and 100 in the example of an input part of the model in FIG. 2 are corresponding data intensities in the previous 4 seconds, the previous 3 seconds, the previous 2 seconds, and the previous 1 second, respectively. V in the example of the model input part is an intermediate vector obtained by the model input processing. 75, 50, 25, and 50 in the example of the model output part in FIG. 2 are predicted values of the data intensities corresponding to the next 1 second, the next 2 seconds, the next 3 seconds, and the next 4 seconds, respectively. An input-output relationship illustrated in FIG. 3 is similar to the input-output relationship illustrated in FIG. 2, and may be obtained with reference to the above description.

Figure 4:
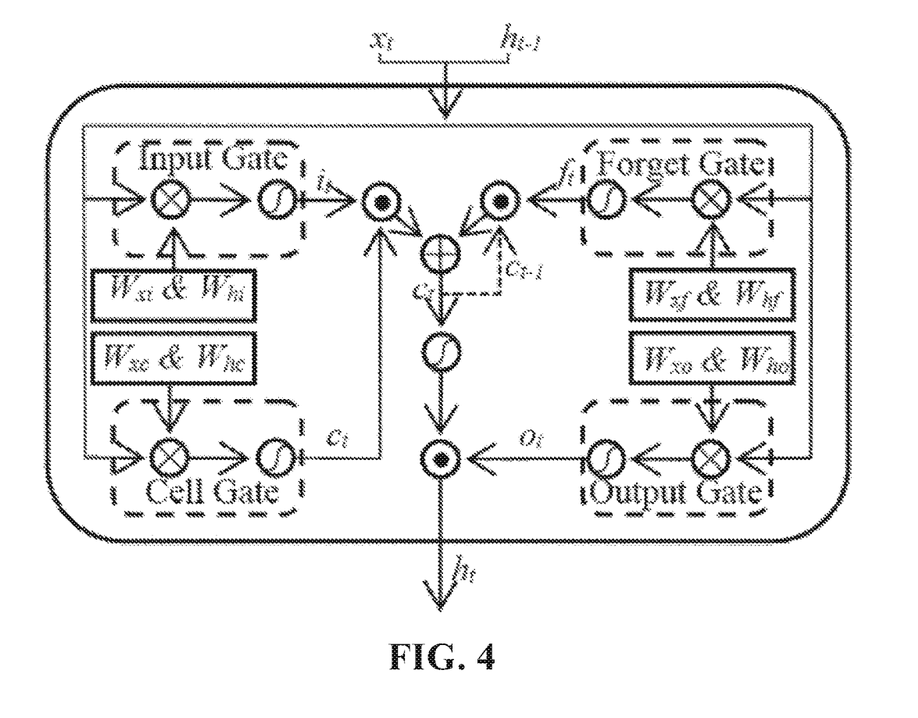
FIG. 4 is a structural diagram of an LSTM Cell disclosed in the present application.

Each box in FIG. 2 and FIG. 3 is a LSTM Cell set, and the structure of each LSTM Cell is shown in FIG. 4. In FIG. 4, $x_t$ and $h_{t-1}$ are input data of the LSTM Cells, $x_t$ is data to be processed of the current LSTM Cell, $h_{t-1}$ is a result output by the previous LSTM Cell, and the input data further includes $c_{t-1}$ output by the previous LSTM Cell. In FIG. 4, "Input Gate," "Forget Gate," "Cell Gate," and "Output Gate" are four processing gates of the current LSTM Cell, and the four processing gates process $x_t$ and $h_{t-1}$ respectively. An inner product operation is performed on a processing result $i_t$ of the "Input Gate" and a processing result $c_t$ of the "Cell Gate" to obtain a first inner product result, and an inner product operation is performed on a processing result $f_t$ of the "Forget Gate" and $c_{t-1}$ output by the previous LSTM Cell to obtain a second inner product result. Then, the first inner product result and the second inner product result are added to obtain a new $c_t$. An inner product operation is performed on the new $c_t$ after passing through an activation function and a processing result $o_t$ of the "Output Gate," thereby obtaining $h_t$ output by the current LSTM Cell. $h_t$ and $c_t$ output by the current LSTM Cell will be input the next LSTM Cell at the same time.

In FIG. 4, "⊗" represents a vector-matrix multiplication operation, "⊕" represents an addition, "⊙" represents a Hadamard Product, and "⊘" represents an activation function. $W_x$ is a weight value of $x_t$ in the current processing gate, and $W_h$ is a weight value of $h_{t-1}$ in the current processing gate. For example, $W_{xi}$ is a weight value of $x_t$ in the "Input Gate", $W_{hi}$ is a weight value of $h_{t-1}$ in the "Input Gate", and so on. There are four processing gates in each LSTM Cell in the LSTM.

A training process of the LSTM model includes: acquiring historical I/O data, and using the historical I/O data as training data of the LSTM model, the future window period of the LSTM model being determined by a cycle in which the solid-state drive is accessed by a service. After the training is completed, the LSTM model can use the data involved in a read and/or write operation of the service to the solid-state drive as an input, and output a corresponding prediction result. The prediction result includes: the data and data intensity involved in the read and/or write operation by the service to the solid-state drive within the future window period.

S103: Manage the solid-state drive according to the prediction result.

In this embodiment, managing the solid-state drive according to the prediction result includes: performing a cache management and/or garbage collection on the solid-state drive according to the prediction result.

As it can be seen, in the embodiment of the present application, after the historical I/O data is obtained, the prediction model is used to learn the historical I/O data, so as to obtain the prediction result. The prediction result includes: the data intensity of the solid-state drive accessed in the future window period, the data intensity can indicate a data read/write pressure of the solid-state drive in the future window period; when the data intensity is large, it indicates that the data read/write pressure of the solid-state drive in the future window period is high; and when the data intensity is small, it indicates that the data read/write pressure of the solid-state drive in the future window period is low. Therefore, managing the solid-state drive according to the prediction result includes:

suspending a low-priority service request in the solid-state drive within the future window period when the data read/write pressure of the solid-state drive in the future window period is high; and responding to the low-priority service request in the solid-state drive in a timely manner within the future window period when the data read/write pressure of the solid-state drive in the future window period is low, so as to avoid a low-priority service from affecting the response of the solid-state drive to a user read/write operation. The future window period is determined according to the cycle in which the solid-state drive is accessed, that is, the prediction result output by the prediction model is associated with the cycle in which the solid-state drive is accessed. The access period has a certain regularity, and therefore, it provides a guarantee for the accuracy of the prediction result, thus providing reliable data support for the effective management of the solid-state drive. Therefore, the present application realizes the effective management of the solid-state drive, improves the read-write performances of the solid-state drive, and avoids the delay of a response time to a user operation, thereby improving the service capability of the solid-state drive.

Figure 5:
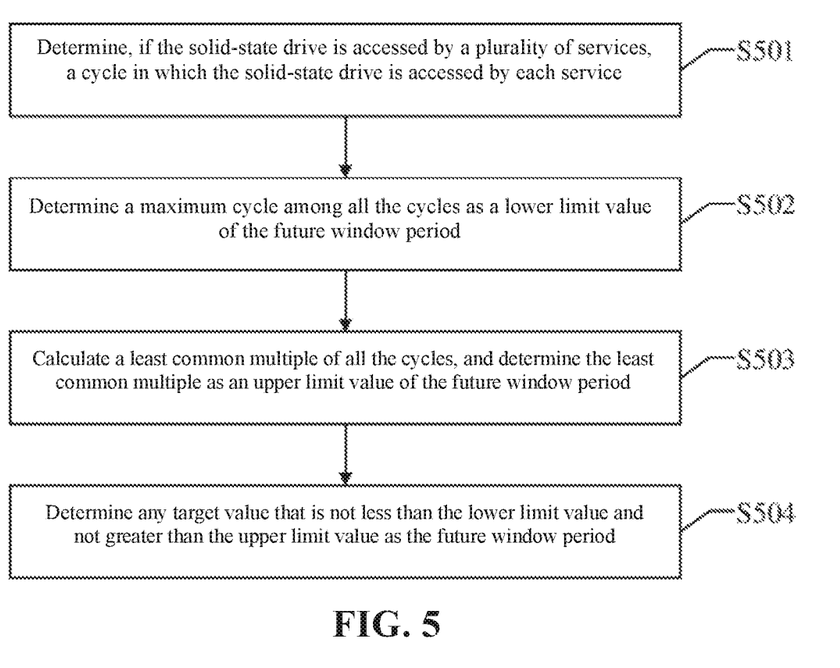
FIG. 5 is a flowchart of a method for determining a future window period disclosed in the present application.

Referring to FIG. 5, FIG. 5 discloses a method for determining a future window period, including the following steps.

S501: Determine, if the solid-state drive is accessed by a plurality of services, a cycle in which the solid-state drive is accessed by each service.

S502: Determine a maximum cycle among all the cycles as a lower limit value of the future window period.

S503: Calculate a least common multiple of all the cycles, and determine the least common multiple as an upper limit value of the future window period.

S504: Determine any target value that is not less than the lower limit value and not greater than the upper limit value as the future window period.

It should be noted that a plurality of services accessing the solid-state drive may belong to the same system or may belong to different systems. If the plurality of services belong to a target system, cycles in which different services in the target system access the solid-state drive are different. Therefore, the least common multiple of the cycles may be large. If the least common multiple is directly determined as the future window period, the future window period may be too long. To prevent the future window period from being too long, in this embodiment, any target value that is not less than the lower limit value and not greater than the upper limit value is determined as the future window period.

For example, it is assumed that there are 3 services accessing the solid-state drive according to their respective cycles. The cycle of service A accessing the solid-state drive is 10 seconds, the cycle of service B accessing the solid-state drive is 20 seconds, and the cycle of service C accessing the solid-state drive is 30 seconds, then the least common multiple of all the cycles is 60 seconds. At this time, any value (such as 30 seconds, 40 seconds, and 45 seconds) between 30 seconds and 60 seconds (including the endpoint value) may be taken and determined as the future window period.

In a specific implementation, the method further includes: calculating the greatest common divisor of all the cycles, and determining the greatest common divisor as a prediction interval; and determining a plurality of prediction points in the future window period according to the prediction interval, where the prediction points are in one-to-one correspondence with the predicted values, and the prediction result includes the predicted values.

On the basis of the above example, if the future window period is determined to be 60 seconds according to the services A, B, and C, 10 seconds, i.e., the greatest common divisor of the access periods of 10 seconds, 20 seconds, and 30 seconds, is determined as the prediction interval. Therefore, within the future window period of 60 seconds (0-60 seconds), 6 prediction points may be determined. The 6 prediction points correspond to the 10th, 20th, 30th, 40th, 50th, and 60th seconds respectively, then each prediction point may correspond to one predicted value, and the prediction result may include 6 predicted values. According to the 6 predicted values, it can be determined. whether the management of the solid-state drive is suitable for the corresponding predicted point. Each predicted value is the data intensity at a moment in which the predicted point lies.

As it can be seen from the above, in this embodiment, an appropriate future window period can be determined according to the cycle in which the solid-state drive is accessed by the target system. If the future window period is too long, the pressure on the prediction model will be high, and the prediction result will not be of reference value. If the future window period is too short, the prediction result will not be of much significance due to the inability to operate in time. According to the thud provided in this embodiment, an appropriate future window period may be determined according to the actual access condition of the target system to the solid-state drive, so that the accuracy of the prediction result can be improved, thereby providing a reliable basis for realizing effective management of the solid-state drive and improving the read-write performances of the solid-state drive.

A data processing apparatus according to an embodiment of the present application will be described below, and the data processing apparatus described below and the data processing method described above may be referred to each other.

Figure 6:
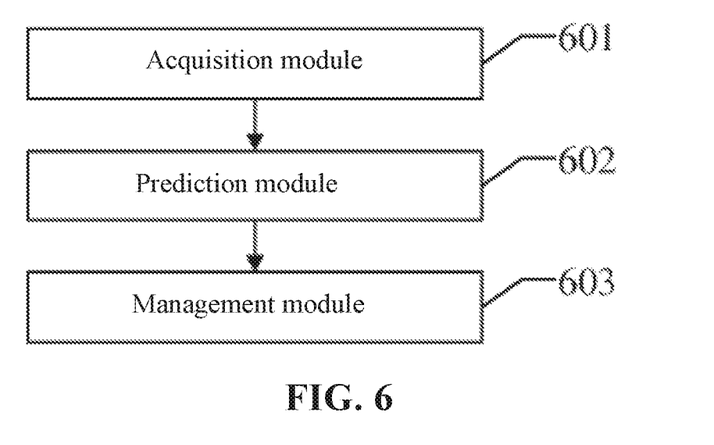
FIG. 6 is a schematic diagram of a data processing apparatus disclosed in the present application.

Referring to FIG. 6, a data processing apparatus is disclosed in an embodiment of the present application, which is applied to a solid-state drive, including:
  acquisition module 601 configured to acquire historical I/O data, where the historical I/O data is data of the solid-state drive that is accessed within a preset time period;
  prediction module 602 configured to use a prediction model to learn the historical I/O data to obtain a prediction result, where the prediction result includes a data intensity of the solid-state drive to be accessed within a future window period, and the future window period is determined according to a cycle in which the solid-state drive is accessed; and
  management module 603 configured to manage the solid-state drive according to the prediction result.

In a specific implementation, the apparatus further includes: a determination module configured to determine the future window period, and the determination module is specifically configured to:
  determine, if the solid-state drive is accessed by only one service, a cycle in which the solid-state drive is accessed by the current service as the future window period.

In a specific implementation, the determination module includes:
  a first determination unit configured to determine, if the solid-state drive is accessed by a plurality of services, a cycle in which the solid-state drive is accessed by each service; and
  a first calculation unit configured to calculate a least common multiple of all the cycles, and determine the future window period through the least common multiple.

In a specific implementation, the calculation unit includes:
  a first determination subunit configured to determine a maximum cycle among all the cycles as a lower limit value of the future window period;
  a second determination subunit configured to determine the least common multiple as an upper limit value of the future window period; and
  a third determination subunit configured to determine any target value that is not less than the lower limit value and not greater than the upper limit value as the future window period.

In a specific implementation, the determination module further includes:
  a second calculation unit configured to calculate a greatest common divisor of all the cycles and determine the greatest common divisor as a prediction interval; and
  a second determination unit configured to deter mine a plurality of prediction points in the future window period according to the prediction interval.

In a specific implementation, the prediction module is specifically configured to:
  use an LSTM model to learn the historical I/O data to obtain the prediction result.

In a specific implementation, the management module is specifically configured to:
  perform a cache management and/or garbage collection on the solid-state drive according to the prediction result.

For the more specific working process of various modules and units in this embodiment, reference may be made to the corresponding content disclosed in the foregoing embodiments, which will not be repeated here.

As it can be seen, this embodiment provides a data processing apparatus, which realizes the effective management of the solid-state drive, improves read-write performances of the solid-state drive, and avoids a delay of a response time to a user operation, thereby improving a service capability of the solid-state drive.

A data processing device according to an embodiment of the present application will be described below. The data processing device described below and the data processing method and apparatus described above may be referred to each other.

Figure 7:
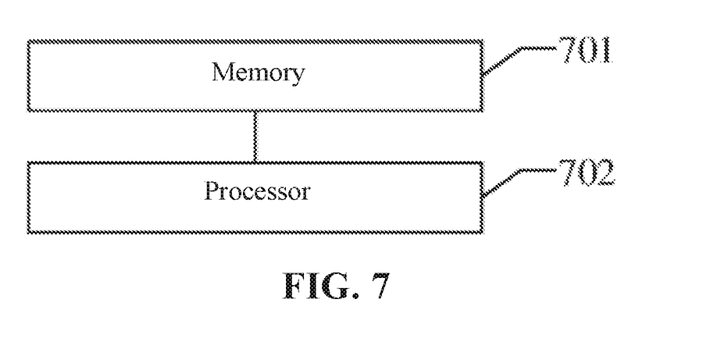
FIG. 7 is a schematic diagram of a data processing device disclosed in the present application.

Referring to FIG. 7, a data processing device is disclosed in an embodiment of the present application, including:
  memory 701 configured to store a computer program; and
  processor 702 configured to execute the computer program to implement the method disclosed in any above embodiments.

A readable storage medium according to an embodiment of the present application will be introduced below. The readable storage medium described below and a data processing method, apparatus, and device described above may be referred to each other.

A readable storage medium is configured to store a computer program, where the computer program, when executed by a processor, implements the data processing method disclosed in the foregoing embodiments. For the specific steps of the method, reference may be made to the corresponding content disclosed in the foregoing embodiments, which will not be repeated here.

"First," "second," "third," "fourth," and the like (if any) referred to in the present application are used for distinguishing similar objects and are not necessarily used for describing a specific order or sequence. It is to be understood that data so used may be interchanged under appropriate circumstances so that the embodiments described herein can be implemented in sequences other than those illustrated or described herein. Furthermore, terms such as "include," "have," and any variations thereof are intended to cover non-exclusive inclusion. For example, a process, a method, or a device including a series of steps or units is not necessarily limited to those steps or units expressly listed, but may include other steps or units not expressly listed or inherent to these processes, methods, or devices.

It should be noted that the descriptions involving "first," "second," and the like in the present application are only for the purpose of description, and should not be construed as indicating or implying their relative importance or implying the number of indicated technical features.

Therefore, a feature delimited with "first" or "second" may expressly or implicitly include at least one feature. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist, and is not within the protection scope claimed in the present application.

The various embodiments in this specification are described in a progressive manner, and each embodiment focuses on the differences from other embodiments, and the same or similar parts between the various embodiments may be referred to each other.

The steps of a method or an algorithm described with reference to the embodiments disclosed herein may be directly implemented in hardware, a software module executed by a processor, or a combination thereof. The software module may be placed in a random access memory (RAM), an internal memory, a read only memory (ROM), an electrically programmable ROM, an electrically erasable programmable ROM, a register, a hard disk, a removable disk, a CD-ROM, or a readable storage medium in any other form of that is well known in the technical field.

The principles and implementations of the present application are described herein using specific examples. The descriptions of the above embodiments are only used for helping understand the methods and core ideas of the present application. At the same time, for those of ordinary skill in the art, there will be changes in the specific implementations and application scope according to the spirit of the present application. To sum up, the content of this specification should not be construed as a limitation to the present application

The invention claimed is:

1. A data processing method applied to a solid-state drive, comprising:
acquiring historical input/output (I/O) data, wherein the historical I/O data comprises data of the solid-state drive accessed within a preset time period;
using a prediction model to learn the historical I/O data to obtain a prediction result, wherein the prediction result comprises an expected data access intensity of the solid-state drive in a future window period, and the future window period is determined according to a cycle in which the solid-state drive is accessed; and
managing the solid-state drive according to the prediction result, comprising:
responsive to the expected data access intensity of the solid-state drive being greater than a threshold, suspending a low-priority service request in the solid-state drive in the future window period; and
responsive to the expected data access intensity of the solid-state drive being smaller than the threshold, responding to the low-priority service request in the solid-state drive in the future window period,
wherein the data processing method further comprises:
responsive to the solid-state drive being accessed by a plurality of services, determining a corresponding cycle in which the solid-state drive is accessed by each service so that a plurality of cycles are determined for the plurality of services, respectively;
determining a maximum cycle among the plurality of cycles as a lower limit value of the future window period; and
determining a least common multiple of the plurality of cycles as an upper limit value of the future window period.

2. The data processing method according to claim 1, further comprising:
responsive to the solid-state drive being accessed by only one service, determining a cycle in which the solid-state drive is accessed by the service as the future window period.

3. The data processing method according to claim 1, wherein determining the future window period comprises:
determining a target value that is not less than the lower limit value and not greater than the upper limit value as the future window period.

4. The data processing method according to claim 1, further comprising:
calculating a greatest common divisor of the plurality of cycles and determining the greatest common divisor as a prediction interval; and
determining a plurality of prediction points in the future window period according to the prediction interval.

5. The data processing method according to claim 1, wherein using the prediction model to learn the historical I/O data to obtain the prediction result comprises:
using a long short-term memory (LSTM) model to learn the historical I/O data to obtain the prediction result.

6. The data processing method according to claim 1, wherein managing the solid-state drive according to the prediction result comprises:
performing at least one of a cache management or garbage collection on the solid-state drive according to the prediction result.

7. A data processing device, comprising:
a memory configured to store a computer program; and
a processor, responsive to an execution of the computer program, configured to:
acquire historical input/output (I/O) data, wherein the historical I/O data comprises data of a solid-state drive accessed within a preset time period;
use a prediction model to learn the historical I/O data to obtain a prediction result, wherein the prediction result comprises an expected data access intensity of the solid-state drive in a future window period, and the future window period is determined according to a cycle in which the solid-state drive is accessed; and
manage the solid-state drive according to the prediction result by:
responsive to the expected data access intensity of the solid-state drive being greater than a threshold, suspending a low-priority service request in the solid-state drive in the future window period; and
responsive to the expected data access intensity of the solid-state drive being smaller than the threshold, responding to the low-priority service request in the solid-state drive in the future window period,
wherein the processor is further configured to:
responsive to the solid-state drive being accessed by a plurality of services, determine a corresponding cycle in which the solid-state drive is accessed by each service so that a plurality of cycles are determined for the plurality of services, respectively;
determine a maximum cycle among the plurality of cycles as a lower limit value of the future window period; and
determine a least common multiple of the plurality of cycles as an upper limit value of the future window period.

8. The data processing device according to claim 7, wherein the processor is further configured to:
responsive to the solid-state drive being accessed by only one service, determine a cycle in which the solid-state drive is accessed by the service as the future window period.

9. The data processing device according to claim 7, wherein to determine the future window period, the processor is further configured to:
determine a target value that is not less than the lower limit value and not greater than the upper limit value as the future window period.

10. The data processing device according to claim 7, wherein the processor is further configured to:
calculate a greatest common divisor of the plurality of cycles and determine the greatest common divisor as a prediction interval; and
determine a plurality of prediction points in the future window period according to the prediction interval.

11. The data processing device according to claim 7, wherein to use the prediction model to learn the historical I/O data to obtain the prediction result, the processor is configured to:
use a long short-term memory (LSTM) model to learn the historical I/O data to obtain the prediction result.

12. The data processing device according to claim 7, wherein to manage the solid-state drive according to the prediction result, the processor is configured to:
perform at least one of a cache management or garbage collection on the solid-state drive according to the prediction result.

13. A non-transitory computer-readable storage medium, configured to store a computer program, wherein the computer program, when executed by a processor, causes the processor to perform operations, comprising:
acquiring historical input/output (I/O) data, wherein the historical I/O data comprises data of a solid-state drive accessed within a preset time period;
using a prediction model to learn the historical I/O data to obtain a prediction result, wherein the prediction result comprises an expected data access intensity of the solid-state drive in a future window period, and the future window period is determined according to a cycle in which the solid-state drive is accessed; and
managing the solid-state drive according to the prediction result, comprising:
responsive to the expected data access intensity of the solid-state drive being greater than a threshold, suspending a low-priority service request in the solid-state drive in the future window period; and
responsive to the expected data access intensity of the solid-state drive being smaller than the threshold, responding to the low-priority service request in the solid-state drive in the future window period,
wherein the operations further comprise:
responsive to the solid-state drive being accessed by a plurality of services, determining a corresponding cycle in which the solid-state drive is accessed by each service so that a plurality of cycles are determined for the plurality of services, respectively;
determining a maximum cycle among the plurality of cycles as a lower limit value of the future window period; and
determining a least common multiple of the plurality of cycles as an upper limit value of the future window period.

14. The computer-readable storage medium according to claim 13, wherein the operations further comprise:
responsive to the solid-state drive being accessed by only one service, determining a cycle in which the solid-state drive is accessed by the service as the future window period.

15. The computer-readable storage medium according to claim 13, wherein determining the future window period comprises:
determining a target value that is not less than the lower limit value and not greater than the upper limit value as the future window period.

16. The computer-readable storage medium according to claim 13, wherein the operations further comprise:
calculating a greatest common divisor of the plurality of cycles and determining the greatest common divisor as a prediction interval; and
determining a plurality of prediction points in the future window period according to the prediction interval.

17. The computer-readable storage medium according to claim 13, wherein using the prediction model to learn the historical I/O data to obtain the prediction result comprises:
using a long short-term memory (LSTM) model to learn the historical I/O data to obtain the prediction result.

18. The computer-readable storage medium according to claim 13, wherein managing the solid-state drive according to the prediction result comprises:
performing at least one of a cache management or garbage collection on the solid-state drive according to the prediction result.

* * * * *